(12) United States Patent
Eshet et al.

(10) Patent No.: US 8,218,651 B1
(45) Date of Patent: Jul. 10, 2012

(54) SYSTEM AND METHOD FOR SPLICING

(75) Inventors: Amit Eshet, Kiryat Tivon (IL); Lior Assouline, Rishon Lezion (IL); Edward Stein, Tel-Aviv (IL)

(73) Assignee: ARRIS Group, Inc, Suwanee, GA (US)

( * ) Notice: Subject to any disclaimer, the term of this patent is extended or adjusted under 35 U.S.C. 154(b) by 1480 days.

(21) Appl. No.: 11/680,172

(22) Filed: Feb. 28, 2007

Related U.S. Application Data

(60) Provisional application No. 60/777,801, filed on Feb. 28, 2006.

(51) Int. Cl.
*H04N 7/12* (2006.01)
*H04N 9/475* (2006.01)
*H04J 3/06* (2006.01)
*H04N 7/10* (2006.01)
*H04N 7/24* (2011.01)
*H04N 7/173* (2011.01)

(52) U.S. Cl. ............... 375/240.26; 375/240.05; 370/504; 348/515

(58) Field of Classification Search ............. 375/240.26, 375/240.05; 370/504; 348/515
See application file for complete search history.

(56) References Cited

U.S. PATENT DOCUMENTS

| | | | |
|---|---|---|---|
| 6,181,383 B1 * | 1/2001 | Fox et al. | 348/515 |
| 7,031,348 B1 * | 4/2006 | Gazit | 370/504 |

FOREIGN PATENT DOCUMENTS

EP 1463330 A1 * 9/2004

OTHER PUBLICATIONS

Radha, H.; Balakrishnan, M.; "Compressed video seamless switching using variable splicing parameters"; Image Processing, 1998. ICIP 98. Proceedings. 1998 International Conference on vol. 1, Digital Object Identifier: 10.1109/ICIP.1998.723654, Publication Year: Mar. 1998, pp. 862-865.*

* cited by examiner

*Primary Examiner* — Eleni Shiferaw
*Assistant Examiner* — Courtney Fields
(74) *Attorney, Agent, or Firm* — Reches Patents

(57) ABSTRACT

A method for splicing a first data stream that conveys a first single program transport stream (SPTS) and a second data stream that conveys a second SPTS, the method includes: receiving first data stream metadata units representative of first data stream packets, second data stream metadata units representative of second data stream packets and a request to perform a splicing operation at a n'th splicing point; performing, in response to the splicing request, transport stream layer processing of the first data stream metadata units and of the second data stream metadata units such as to provide a control output stream; and transmitting an output stream in response to the control output stream.

56 Claims, 4 Drawing Sheets

SYSTEM AND METHOD FOR SPLICING

RELATED APPLICATIONS

This application claims the priority of U.S. provisional patent filed on Feb. 28, 2006, Ser. No. 60/777,801.

BACKGROUND OF THE INVENTION

Media can be provided to end users over dedicated networks such as cable networks and over multi-purpose networks such as Internet Protocol compliant networks. This provision of media over multi-purpose networks requires an encapsulation of media streams such as MPEG compliant Multiple Program Transport Streams and Single Program Transport Streams within non-video frames or packets such as UDP or RTP frames. The Multiple Program Transport Stream (MPTS) and the Single Program Transport Stream (SPTP) are complex data structures.

MPEG transport streams (either SPTS or MPTS) are generated by a complex process that starts by generating (or receiving) elementary streams such as control data elementary stream, video elementary stream and audio elementary stream. Video and audio elementary streams include multiple access units (AU) that are the fundamental unit of encoding. An elementary stream is converted to a sequence of packetized elementary stream (PES) packets. A video PES packet includes video payload as well as a PES header. An audio PES packet includes audio payload as well as a PES header. The PES header includes, among other things, a presentation time stamp (PTS) and a decode time stamp (DTS) that indicate when the PES packet should be presented and decoded. Each PES packet is broken into fixed sized transport packets (TPs). A Transport packet includes a TP header and a TP payload. The TP header includes a packet identifier (PID) that identifies the elementary stream associated with the TP. The TP header includes an adaptation field that can indicate that the TP header is followed by additional metadata. This additional metadata includes a program clock reference (PCR) field, a discontinuity indicator and the like. The PCR is used for synchronizing the encoding, decoding, transmission and reception of the TPs.

When a SPTS is transmitted over a multi-purpose network, multiple TPs can be included within a single data packet. Typically up to seven TPs are included within a single UDP packet.

Advertisements can be inserted into a transport stream by a splicing process. These advertisements can be broadcast to multiple end users although addressable (targeted) advertisement can be more beneficial to the advertised services or products.

Elementary stream splicing involves extracting TPs from data packets and reconstructing PES packets from the extracted TPs, processing the PES packet headers (including, for example, altering (re-stamping) PTSs, DTSs and the like, packetizing the PES packets in TPs and packetizing the TPs in data packets). Accordingly, elementary stream splicing is a complex task and requires substantial processing resources.

Elementary stream splicing can also be difficult (if not impossible) to implement when the STPS is encrypted. If the TP payload is encrypted the alteration of DTS and PTS requires decrypting the TP. A prior art method is illustrated in U.S. Pat. No. 7,027,516 of Anderson et al., which is incorporated herein by reference.

There is a need to provide systems and methods that can efficiently perform splicing on encrypted and on non-encrypted (clear) streams.

SUMMARY OF THE INVENTION

A method for splicing a first data stream that conveys a first single program transport stream (SPTS) and a second data stream that conveys a second SPTS, the method includes: receiving first data stream metadata units representative of first data stream packets, second data stream metadata units representative of second data stream packets and a request to perform a splicing operation at a n'th splicing point; performing, in response to the splicing request, transport stream layer processing of the first data stream metadata units and of the second data stream metadata units such as to provide a control output stream; and transmitting an output stream in response to the control output stream.

A splicing system adapted to splice a first data stream that conveys a first single program transport stream (SPTS) and a second data stream that conveys a second SPTS, the splicing system includes: a memory unit adapted to store first data stream metadata units representative of first data stream packets and second data stream metadata units representative of second data stream packets; and a processor, adapted to perform, in response a request to perform a splicing operation at a n'th splicing point, transport stream layer processing of the first data stream metadata units and of the second data stream metadata units such as to provide a control output stream; and wherein the system is adapted to transmit an output stream in response to the control output stream.

BRIEF DESCRIPTION OF THE DRAWINGS

The foregoing and other objects, features, and advantages of the present invention will become more apparent from the following detailed description when taken in conjunction with the accompanying drawings. In the drawings, similar reference characters denote similar elements throughout the different views, in which.

DETAILED DESCRIPTION OF THE DRAWINGS

Figure 1:
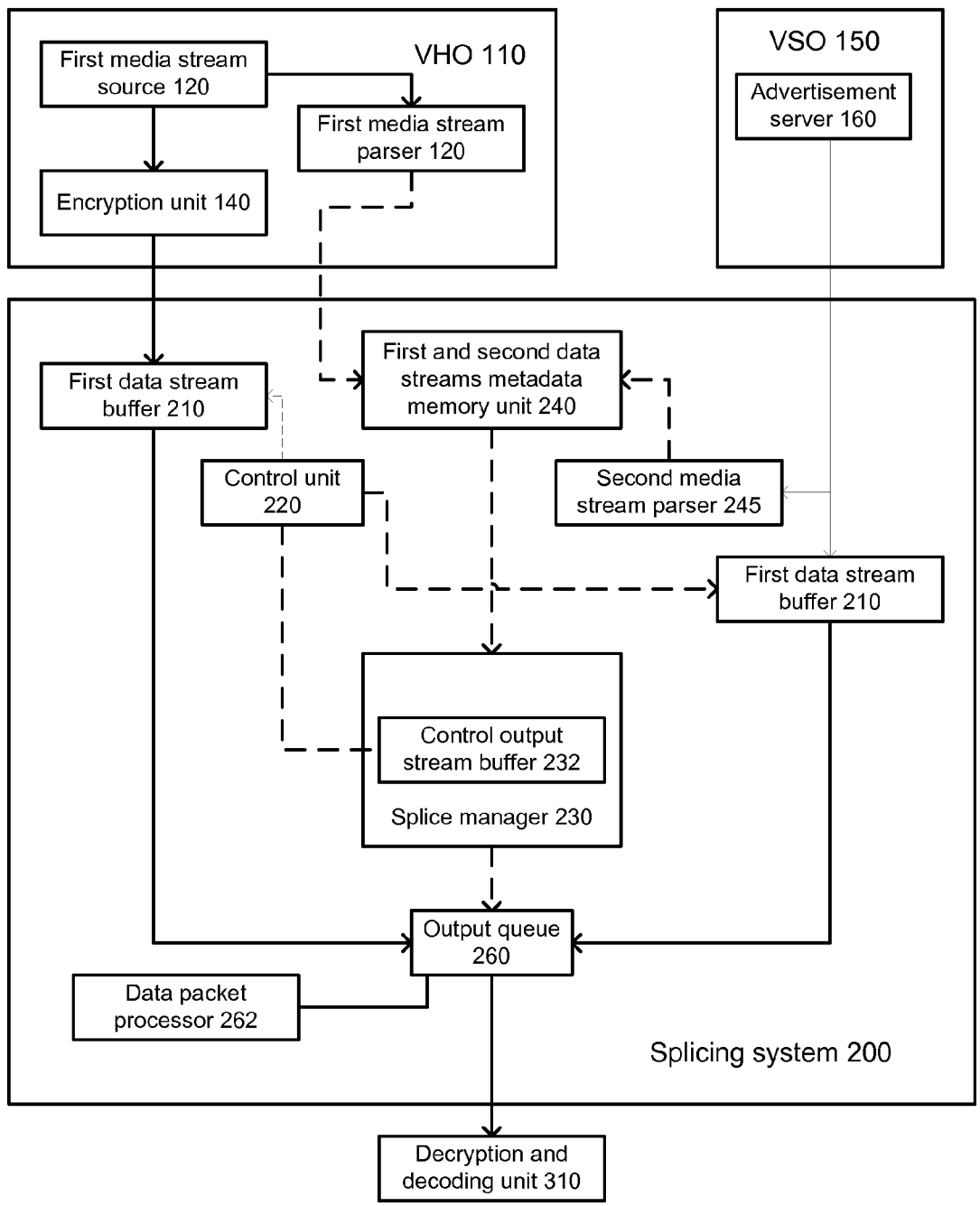
FIG. 1 illustrates a splicing system and its environment, according to an embodiment of the invention.

According to an embodiment of the invention a system and method that perform transport packet based splicing without substantially performing elementary stream processing operations. The suggested methods and systems reduce the computational load associated with the splicing process.

According to an embodiment of the invention the systems and methods are also adapted to associate metadata to data packets groups and to perform various operations (including multiplexing audio and video data packets) that are responsive to data packet group metadata.

According to yet another embodiment of the invention the suggested methods and systems are adapted to splice media streams that include encrypted transport packet payloads.

The splicing of a MPTS is much more complex than the splicing of an SPTS. In modern multiple-purpose networks the MPTS can be altered multiple times and eventually the user can be provided with a Single Program Transport Stream. Accordingly, the inventors utilized SPTS splicing which is simpler to implement. Multiple SPTSs can then be easily multiplexed to provide Multi Program Transport Streams.

According to an embodiment of the invention the splicing system and method attempt to output a SPTS that has substantially the same average (or sustained) bit rate as the SPTS provided to the splicing system. Conveniently, the maximal transient bit rate of the SPTS that is outputted from the splicing system is limited to a maximal bit rate, in order to prevent possible bottlenecks in components that follow the splicing system.

Yet according to an embodiment of the invention multiple splicing points (such as splice in point and splice out point) are defined in advance and provided to the splicing system. The splicing system does not substantially alter the timing of the splicing points.

According to an embodiment of the invention the method includes a stage of repeatedly evaluating whether to perform splicing until a positive answer is received. Thus the method can delay the slicing if predefined slicing conditions are not fulfilled.

It is noted that in various scenarios a splicing process includes splicing from a first SPTS to a second SPTS and then (after a certain period) splicing from the second SPTS to a third SPTS. For simplicity of explanation it is assumed that the third SPTS is the first SPTS but this is not necessarily so. This scenario is typically applied during advertisement insertion. An advertisement (conveyed over second SPTS) is inserted during a break period that is delimited by a n'th splicing point and by a (n+1)'th splicing point, wherein n is a positive integer.

Table 1 illustrates various abbreviations and terms the are used in the pages below:

TABLE 1

| | |
|---|---|
| SPTS | Single program transport stream |
| AU | Access unit |
| PTS | Presentation time stamp |
| ES | Elementary stream |
| BF | Black frame (video) |
| MF | Mute frame (audio) |
| BR | Bit rate |
| PES | Packetized elementary stream |
| PCR | Program clock reference |
| DTS | Decode time stamp |
| FI | Frame interval. Can be a video frame interval or an audio frame interval. |
| ECM | Entitlement control messages |
| Current stream | SPTS out of which splicing is to be performed. |
| Next stream | SPTS into which splicing is to be performed. During the first splicing point this is the second SPTS |
| Video splice time | The first PTS of the next video stream. |
| Audio splice time | The first PTS of the next audio stream. |
| Video out point | The last video byte from the current stream. |
| Audio out point | The last audio byte from the current stream. |
| Video in point | The first video byte from the next stream. |
| Audio in point | The first audio byte from the next stream. |
| CVA | Current SPTS video and audio till video out point. |
| CA | Current SPTS audio from video out point to audio out point. |
| NV | Next SPTS video from video in point to audio in point. |
| NVA | Next SPTS video and audio starting form audio in point. |

TABLE 1-continued

| | |
|---|---|
| Audio data packet | Data packet that conveys audio. The payload of the data packet includes at least one audio transport packet. |
| Video data packet | Data packet that conveys video. The payload of the data packet includes at least one video transport packet. |
| Splicing point | Video out point, video splice time or audio splice time. |

FIG. 1 illustrates splicing system 200 and its environment, according to an embodiment of the invention.

It is assumed that the first data stream conveys a first SPTS and that the second data stream conveys a second SPTS that is an advertisement stream. Splicing system 200 includes a processor such as splice manager 230, first data stream buffer 210, control unit 220, a memory unit such as first and second data streams metadata memory unit 240, a second data stream parser 245, a second data stream buffer 250, and output queue 260. The output queue 260 can be connected to a data packet processor 262 that can process data packets to provide processed data packets.

Splice manager 230 is connected to control unit 220, first and second data stream metadata memory unit 240 and to output queue 260. Second data stream parser 245 is connected to second data stream buffer 250 and first and second data stream metadata memory unit 240. Output queue 260 is also connected to first data stream buffer 210 and to second data stream buffer 250. Splice manager 230 includes (or is connected to) a control output stream buffer 232 that stores a control output stream.

Control unit 220 accesses the control output stream buffer and in response can control a provision of first data stream packets and second data stream packets to output queue 260. It is noted that control unit 220 can control a provision of a data stream packet to data packet processor 262. The data packet processor processes the data stream packet to provide a processed data stream packet. The processed data stream packet is sent to output queue 260. It is further noted that the data packet processor 262 can receive the unprocessed data stream packet from the output queue 260 or from one buffer out of the first data stream buffer 210 and the second data stream buffer 250.

Splicing system 200 is connected to a provider of a first data stream and to a provider of the second data stream. Both data stream providers can be integrated with each other, located in remote locations and the like.

For simplicity of explanation it is assumed that a provider of the first data stream is video hub office (VHO) 110 and that the provider of the second data stream is video serving office (VSO) 150 that includes an advertisement server 160.

VHO 110 includes a first media stream source 120 that is connected to a first media stream parser 130 and to encryption unit 140. First media stream parser sends first data stream metadata units (such as first data stream metadata packets) to first and second data stream metadata memory unit 240. The metadata describes the un-encrypted format of the first media stream. Encryption unit 140 sends a first data stream that conveys a first SPTS (that in turn includes encrypted content) to first data stream buffer 210. It is noted that first media stream parser 130 can also be fed from encryption unit 140 in case encryption unit 140 modifies the SPTS. In this case the metadata can reflect the encrypted SPTS.

VSO 150 sends a second data stream that conveys second SPTS (which is an advertisement conveying SPTS) to second parser 245 and to second data stream buffer 250.

The output queue 260 is connected to a decryption and decoding unit 310 that can be a part of user equipment.

Splicing manager 230 executes various splicing methods, as illustrated in the following pages, and can also decide whether to perform a splicing operation or to delay the slicing operation.

Figure 2:
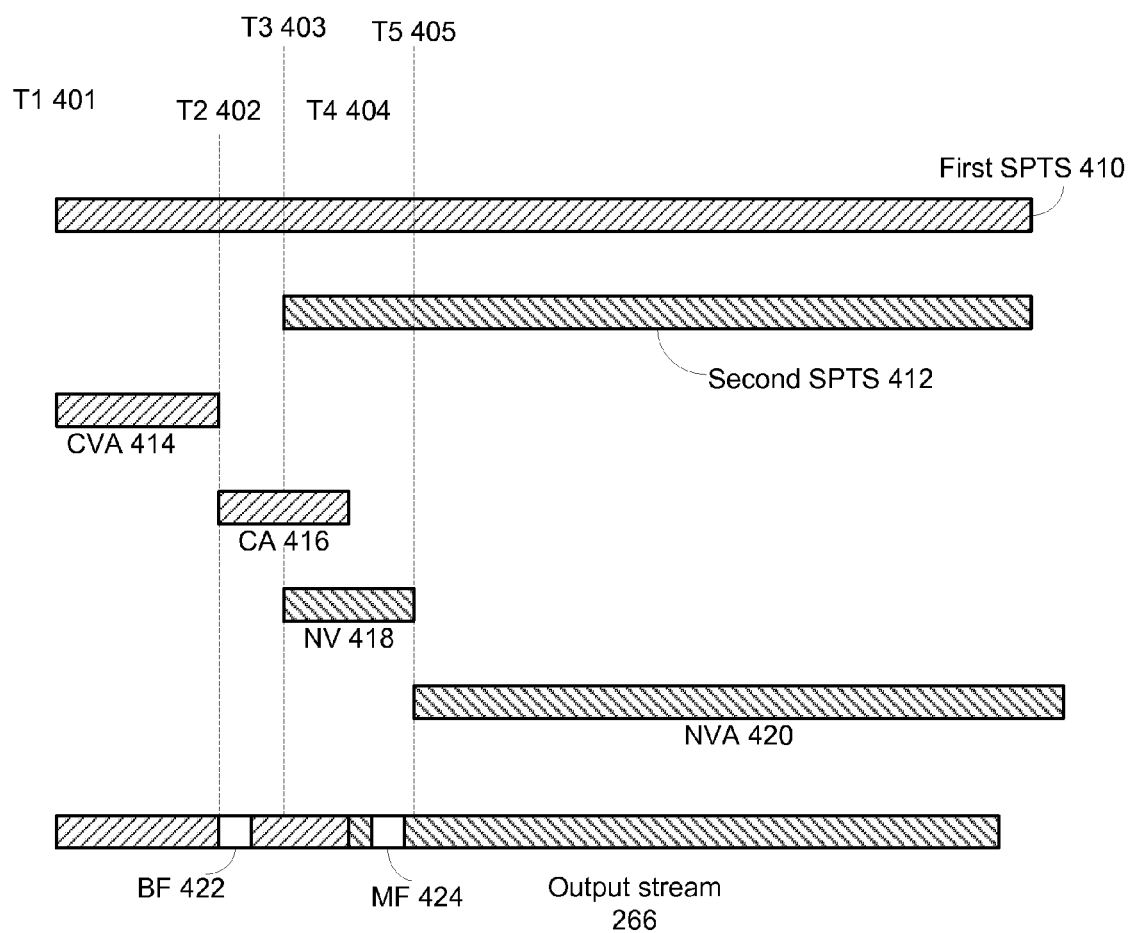
FIG. 2 is a timing diagram illustrating a splicing process according to an embodiment of the invention.

FIG. 2 illustrates an exemplary timing diagram 400 of a splicing event, from a first data stream to the second data stream, according to an embodiment of the invention.

Timing diagram 400 illustrates a splicing from the first data stream to the second data stream. Accordingly the current SPTS is the first SPTS and the next SPTS is the second SPTS.

Timing diagram 400 illustrates T1 401 in which a slicing request is received, T2 402 which is the video out point time, T3 403 which is the video in point time, T4 404 which is the audio out point time and T5 405 which is the audio in point time.

Timing diagram 400 also illustrates an output stream 422 of splicing system 200; first SPTS stream 410, second stream 412, CVA 414, CA 416, NV 418, NVA 420, a black frame 422 and a mute frame 424.

Between T1 401 and T2 402 output stream 422 includes CVA 414. Thus, first SPTS 410 is transmitted with its original timing. Between T2 402 and T3 403 output stream 266 includes CA 416 and an optional black frame sequence 422. CA 416 and black frame sequence 422 can be interleaved. Between T3 403 and T4 404 output stream 266 includes CA 416 and NV 418. CA 416 and NV 418 can be interleaved. Between T4 404 and T5 405 output stream 266 includes NV 418 and optional mute frame sequence 424. NV 418 and optional mute frame sequence 424 can be interleaved. After T5 405 output stream 266 includes portions of second SPTS 412.

It is noted that each of the various streams represented is conveyed in multiple data stream packets that are represented by multiple data stream metadata units. The timing of transmission of each stream as well as optional processing of the data packets is determined by processing data stream metadata units. According to an embodiment of the invention the multiplexing between CA 416 and NV 418 includes associating data packet group metadata to a data packet group that starts by a data packet that includes a TP that in turn includes a PCR field and ends at the last data packet prior to the next data packet that includes a TP that in turn includes the next PCR field.

Each data packet group is characterized by its start time and by the timing difference between two adjacent data packets that belong to the data packet group.

The multiplexing conveniently includes speeding up the transmission of audio conveying data packets. If there is an overlap between a timing of a audio data packet group and a timing of a video data packet group (the overlap can be detected by analyzing data packet group metadata) then the timing of the video data packet can be delayed such as to prevent overlap or the video data packet can be split to two video data packet sub-groups and the timing of at least one of the video data packet sub-group can be altered to prevent overlap.

A data stream metadata unit includes metadata that describes one or more audio or video data packets but conveniently includes metadata that describe a video data packet group or an audio data packet group.

Figure 3:
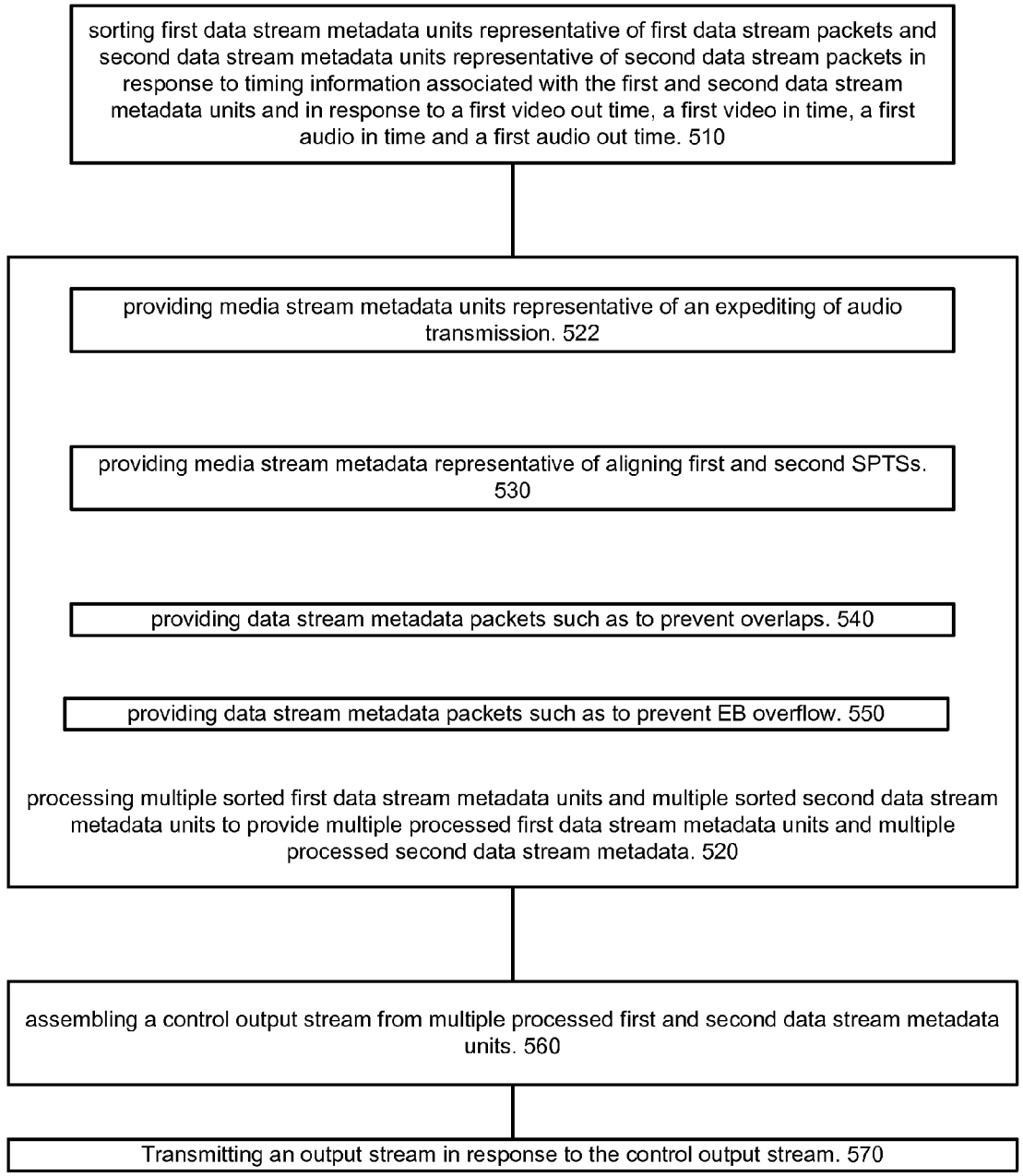
FIGS. 3 and 4 illustrate methods for splicing streams, according to an embodiment of the invention.

FIG. 3 illustrates method 502 according to an embodiment of the invention. It is noted that various stages of 502 are illustrated in greater details in FIG. 4.

Method 502 starts by stage 504 of receiving first data stream metadata units representative of first data stream packets, second data stream metadata units representative of second data stream packets and a request to perform a splicing operation at a n'th splicing point.

Conveniently, stage 504 also includes receiving a request to perform another splicing operation at a (n+1)'th splicing point. Splicing point pairs characterize the insertion of advertisements within a program.

Stage 504 is followed by stage 506 of performing, in response to the splicing request, transport stream layer processing of the first data stream metadata units and of the second data stream metadata units such as to provide a control output stream.

Conveniently, stage 506 includes data packet group metadata. A data packet group can include a group of data packets that start by a data packet that includes a PCR field and ends by the last data packet before the next data packet that includes the following PCR field.

Conveniently, stage 506 includes performing transport stream layer processing that includes preventing frames of the second SPTS to use prediction from frames of the first SPTS by selectively replacing some packets by transparent frame packets and nullifying other packets. Transparent frames include zero valued motion vectors or their equivalents. It is noted that if the default value of a motion vector is zero then the entire macro-block is not encoded.

Typically, a first group of pictures of the second SPTS after the n'th splicing point can include B frames that point to frames of the first SPTS. If, for example, stage 506 is applied on H264 compliant streams then the relevant frames are frames that use prediction from other frames that are transmitted prior to the In-point.

For simplicity of explanation the following explanation will refer to MPEG-2 compliant media streams. The processing involves replacing some B frames packets by transparent frames packets and nullifying other transport packets. The nullification can involve changing the PID value to indicate that the content of the TP should be ignored of.

Conveniently, stage 506 includes sorting first data stream metadata units and second data stream metadata units in response to timing information associated with the first and second data stream metadata units and in response to a n'th video out time, a n'th video in time, a n'th audio in time and a n'th audio out time.

Conveniently, stage 506 includes selectively generating output data stream metadata representative of an output stream discontinuity indicator data packet that includes a transport packet header and an empty elementary stream payload, wherein the transport stream header includes a discontinuity indicator. Stage 506 includes transmitting an output stream that includes at least one output stream discontinuity indicator data packet.

Conveniently, stage 506 includes selectively altering program clock reference values and selectively inserting black frames such as to prevent video buffer overflow and to prevent overlap of video TS packets transmission from the first and second SPTS.

Conveniently, the first SPTS is characterized by a first video frame interval and the second SPTS is characterized by a second video frame interval that differs from the first video frame interval. In this case method 502 can include preventing a timing gap between the $(n+1)^{th}$ video out time and the $(n+1)^{th}$ video in time that is smaller than the first video frame interval. It is noted that the same can apply to audio frames and audio frame intervals.

Conveniently the preventing includes reducing the timing gap by inserting at least one black video frames at video frame rate out of the first frame rate such as to minimize the timing gap. It is noted that this gap reduction is applied when the PTSs and DTS should not be re-stamped (for example when returning from an advertisement). Otherwise, the gap can be closed by re-stamping.

According to an embodiment of the invention stage 506 can include adjusting transmission time values of data packets such as to prevent an increment of network jitter. The reception time is the time in which a data packet was received by the splicing system and the transmission time is the time in which the data packet was transmitted from the splicing system. Conveniently, stage 506 includes: (i) maintaining a first time gap (DT1) between the reception time and the transmission time of each packet of the first data stream until the n'th splicing point; (ii) determining a second time gap (DT2) between the transmission time of the last data packet of the first data stream before the n'th splicing point and the "MPEG time" of the last data packet of the first data stream before the n'th splicing point; (iii) maintaining the second time gap (DT2) between transmission time and "MPEG time" of data packets of the second data stream, between the n'th splicing point and the (n+1)'th splicing point; and (iv) determining a transmission time of data packets of the first data stream, after the (n+1)'th splicing point in response to DT1 (and the reception time of the data packets) or DT2 (and the "MPEG time" of the data packet). Conveniently, the transmission time is calculated by DT2+"MPEG time" of the data packet until (DT1+reception time of the data packet)>(DT2+"MPEG time" of the data packet).

Stage 506 is followed by stage 508 of transmitting an output stream in response to the control output stream.

Conveniently, stage 508 includes multiplexing between audio data packets and video data packets between a video out point and an audio in point. This multiplexing is controlled by metadata generated during stage 506 of performing transport stream layer processing.

Conveniently, stage 508 includes transmitting output stream data packets that include an interleaved set of first SPTS audio frames and second SPTS frames. The interleaved set is transmitted at a bit rate that exceeds a maximal bit rate of the first SPTS audio frames and a maximal bit rate of the second SPTS video frames.

It is noted that stages 510, 520 and 560 of method 500 (FIG. 4) can be included within stage 506 of method 502, but this is not necessarily so.

Figure 4:
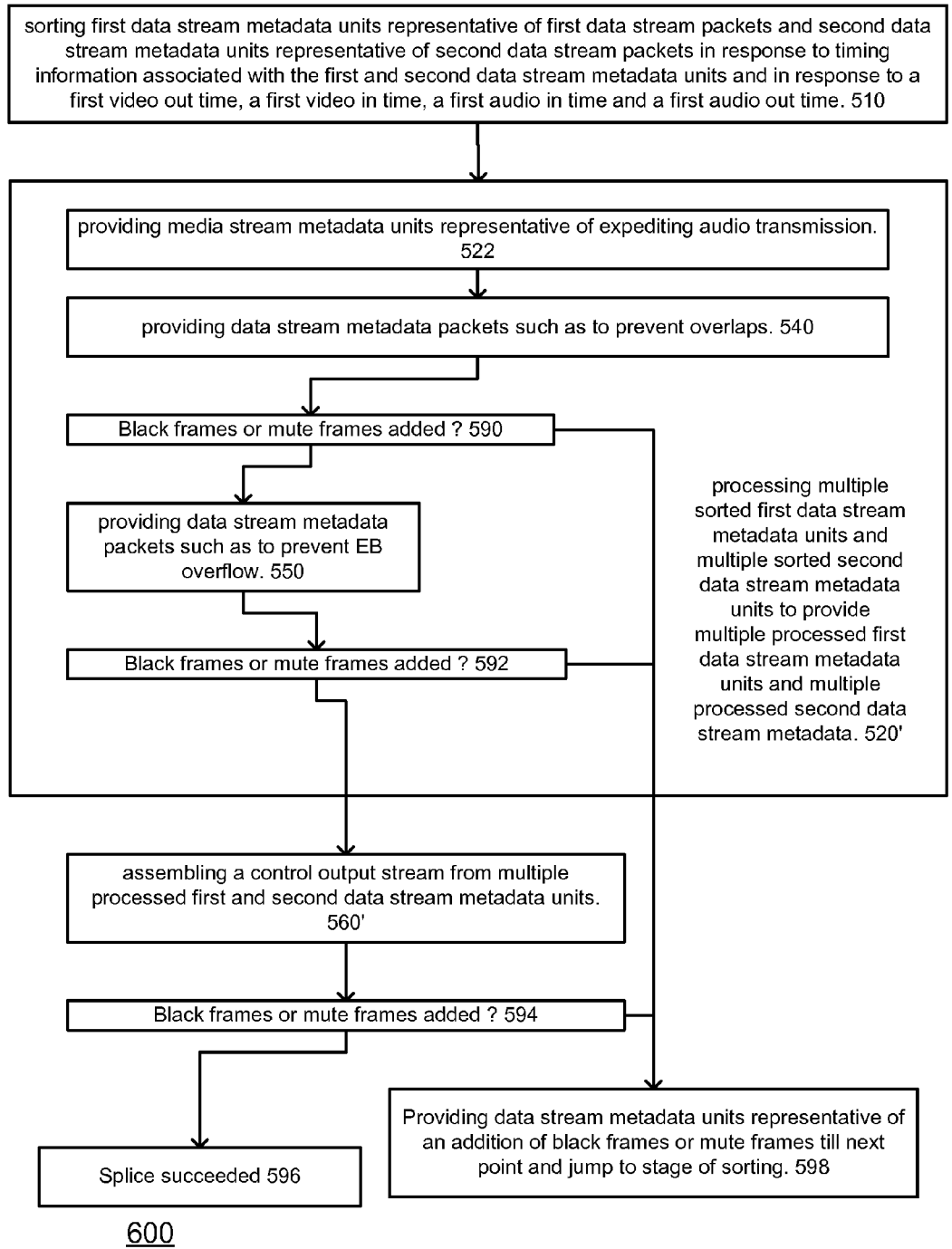

FIG. 4 illustrates method 500 for splicing according to various embodiments of the invention.

Method 500 is applied when the first data stream is replaced by the second data stream.

Method 500 starts by stage 510 of sorting first data stream metadata units representative of first data stream packets and second data stream metadata units representative of second data stream packets in response to timing information associated with the first and second data stream metadata units and in response to a n'th video out time, a n'th video in time, a n'th audio in time and a n'th audio out time.

Conveniently, stage 510 includes sorting the data stream metadata units to separate groups, wherein the separate groups represent CVA 414, CA 416, MF 424, NV 418 and NVA 420.

Conveniently, stage 510 includes at least some of the following steps: (i) nullifying metadata relating to first SPTS video after video out point, (ii) nullifying metadata relating to first SPTS audio after audio out point, (iii) nullifying metadata relating to second SPTS video before video in point, (iv) nullifying metadata relating to second SPTS audio before audio in point, (v) deleting a data stream metadata unit that is completely nullified, (vi) managing second SPTS open group of pictures, (vii) setting video and audio start transmission time for each fixed size portion of the SPTS, (viii) getting second SPTS video DTS and PTS.

It is noted that the sorting can be performed in various manners, such as but not limited to storing data stream metadata units in different queues, associating attributes to the various data stream metadata units, and the like.

Due to the splicing from the first data stream to the second data stream the first group of pictures embedded within the first data packet (or packets) of the second media stream (after the splicing point) can refer to a previous group of pictures that does not exist in the output stream. This first group of pictures can start by B frames (in H264 it can be any frame) that refer to the non-existing group of pictures. Such a group of pictures is known as an open group of pictures. In order to prevent visual artifacts the open group of pictures is amended such as to remove the reference to non-existing group of pictures. For example, B frames that refer to a non-existing group of pictures can be replaced by transparent B frames. If, for example, two B frames of an open group of pictures are replaced then the first B frame can include only forward motion vectors whereas the second B frame will include only backward motion vector.

Stage 510 is followed by stage 520 of processing multiple sorted first data stream metadata units and multiple sorted second data stream metadata units to provide multiple processed first data stream metadata units and multiple processed second data stream metadata. It is noted that during this stage all of first and second data stream metadata units can be processed, but this is not necessarily so. For example, only part of these data stream metadata units can be processed.

According to an embodiment of the invention, stage 520 includes processing multiple sorted first data stream metadata units and multiple sorted second data stream metadata units to provide multiple processed first data stream metadata units and multiple processed second data stream metadata, wherein the processing comprises selectively generating output stream metadata units representative of black frames and mute frames and altering time associated metadata such as to speed up a transmission of first SPTS audio frames.

According to another embodiment of the invention stage 520 includes processing multiple sorted first data stream metadata units and multiple sorted second data stream metadata units to provide multiple processed first data stream metadata units and multiple processed second data stream metadata units, wherein the first SPTS is characterized by a first video frame interval and the second SPTS is characterized by a second video frame interval that differs from the first video frame interval.

According to a further embodiment of the invention stage 520 includes processing multiple sorted first data stream metadata units and multiple sorted second data stream metadata units to provide multiple processed first data stream metadata units and multiple processed second data stream metadata units, wherein the processing comprises generating a black set output data stream metadata representative of a set of black frames that comprises a first black frame portion, a second black frame portion and a first black portion. A frame portion can, for example, be a field.

Conveniently, stage 520 includes at least some of the following stages: stage 522 of providing media stream metadata units representative of an expediting of audio transmission, stage 530 of providing media stream metadata representative of aligning first and second SPTSs, stage 540 of providing data stream metadata packets such as to prevent overlaps, and stage 550 of providing data stream metadata packets such as to prevent buffer overflow. It is noted that the providing can include generating new data stream metadata units, updating existing data stream metadata units, deleting data stream metadata units and the like.

Stage 522 can reduce the number of inserted black frames and mute frames by expediting the CA. Stage 522 can include generating an interleaved audio stream data stream metadata unit list that represent an interleaved audio stream that include multiple audio streams, each bounded by a maximal audio stream bit rate. The interleaving includes, among other things, altering the packet identifiers (PID) included within the data stream metadata units.

Conveniently, stage 522 is executed such as to: (i) minimize audio transmission duration, (ii) avoid buffer violation, and (iii) advance audio transmission as early as possible to minimize the chance of overlap since it can improve splice performance.

Stage 522 can include: (i) performing audio buffer simulation for CVA 414, (ii) collecting an audio AU from CA 416, (iii) getting the earliest possible transmission time for an audio AU, (iv) generating audio data stream metadata units with two PCRs to ensure start and end transmission time, and (v) updating data stream metadata units content.

It is noted that if two audio streams are virtually interleaved then stage 522 may include: (i) Finding the audio stream that starts before the other audio stream. This audio stream is referred to as the earlier audio stream. The set of data stream metadata units representative of that earlier audio stream is referred to as the early set and the set of data stream metadata units that represents the other audio stream is referred to as the late set, and (ii) trying to delay a transmission of a data unit of the earlier audio stream to the start of a transmission of a corresponding data unit of the later audio stream under the following constrains: (a) the early data stream metadata unit does not expand into the following data stream metadata unit, (b) the delay of the early data stream metadata unit does not result in an audio buffer underflow.

Stage 530 includes providing data packet metadata units that will represent aligned first and second SPTSs. The data packet metadata units include consecutive video and audio DTSs and PTSs.

Stage 530 may include at least one of the following stages: (i) providing data packet metadata units representative of an addition of black frames and mute frames so that the first SPTS will be video and audio aligned (the first video PTS and the first audio PTS should be less than 0.5 frame interval apart), (ii) providing data packet metadata units representative of an addition of black frames or mute frames to the second SPTS such that the second SPTS will be video and audio aligned, (iii) providing data packet metadata units representative of a setting of the second SPTS audio PTS to last first audio PTS plus audio frame interval, (iv) providing data packet metadata units representative of a video delay that equals the audio delay, (v) providing data packet metadata units representative of setting the first video PTS of the second SPTS to the last video PTS of the first SPTS plus the video delay, (vi) providing data packet metadata units representative of an increment of the video delay such that a gap between first SPTS and NV will be at least one video frame interval, (v) providing data packet metadata units representative of a filling of the gap between the first SPTS and the second SPTS with black frames.

Stage 540 includes providing data packet metadata units such as to prevent overlaps between CVA and NV and preventing overlaps between CA and NVA. The overlap is prevented by comparing the end transmission time of the CVA/CA and the start transmission time of the NV/NVA, detecting overlaps and inserting black frames that virtually delay the next SPTS. Stage 540 including determining a transmission time of media conveying data packets in response to video timing information associated with the media streams conveyed by the data packets and in response to transmission timing associated with the data packets.

It is assumed that that each data packet is associated with a video (or audio) timing information (referred to as "MPEG time", although the stage is not limited to MPEG compliant media streams) driven from media fields such as a PCR. If a certain data packet includes a PCR field than the value of this PCR field is the "MPEG time" value of the certain packet. Else, the "MPEG time" is driven from the value of the PCR field in the last data packet that preceded the certain data packet and from the value of the PCR field in the next data packet that follows the certain data packet. Linear interpolation is used to extract the "MPEG time" values from these PCR field values.

TMLF is the "MPEG time" value of the last data packet of the first SPTS before the n'th splicing point. PTSLF is the PTS value of the last data packet of the first SPTS before the n'th splicing point. TMFS is the "MPEG time" value of the first data packet of the second SPTS after the n'th splicing point. PTSFS is the PTS value of the first data packet of the second SPTS after the n'th splicing point.

An overlap is detected if |PTSLF−TMLF| is smaller than {|PTSFS−TMFS|−one frame interval}. We will denote {|PTSFS−TMFS|−one frame interval−|PTSLF−TMLF|} as deltaTV. If an overlap is detected then the PTS values of the second data stream packets are updated by deltaTV.

Conveniently, the alteration of PTS values requires inserting black frames, such as to fill the gap resulting from the alteration. It is noted that the same applies to audio frames that are updated by DeltaTA.

Conveniently, PCR and DTS values are also updated by deltaTV or deltaAV.

Conveniently, these updates are simple and occur once every multiple data packets.

Stage 540 is followed by stage 550 providing data packet metadata units such as to prevent buffer overflow. Stage 550 includes providing data packet metadata units representative of an addition of black frame in order to prevent video buffer overflow. Stage 550 may also include providing data packet metadata units representative of an addition of mute frames in order to prevent audio buffer overflow. Stages 550 may include simulating the behavior of the audio buffer.

Conveniently, stage 550 can include at least one of the following stages: simulating the state of the video buffer (such as EB) during a period that starts at the splice point; detecting buffer overflow in response to the simulations; providing data packet metadata units representative of an addition of black frames or mute frames such as to prevent overflows. This addition delays the filling of the video buffer (or audio buffer) by frames from the second SPTS, thus enables the video buffer to be emptier once frames from the second SPTS start filling the buffer. It is also noted that the DTSs, PTSs and PCRs of the second SPTS are delayed by the same interval.

Stage 520 is followed by stage 560 of assembling a control output stream from multiple processed first and second data stream metadata units. It is noted that the assembling can also include assembling the control output stream from unprocessed first and second data stream metadata units. Accordingly, the control output stream may include processed first data stream metadata units, unprocessed first data stream metadata units, processed second data stream metadata units, black frames, mute frames, and unprocessed second data stream metadata units.

Stage 560 conveniently includes transmitting data stream metadata units to an output queue. The content of the output queue is later used to control the transmission of the output single program transport stream. The content can also include instructions for processing first or second data stream packets.

Stage 560 conveniently includes: (i) scheduling CVA data stream metadata units, (ii) scheduling in an interleaved manner the transmission of data stream metadata units representative of: CA, NV, blank frames and mute frame, and (iii) scheduling a transmission of NVA data stream metadata units.

The scheduling of stage 560 is based on the following assumptions: (i) CA and mute frames are addressed as a single sequential audio queue, (ii) black frames and NV are addressed as a single sequential video queue, (iii) audio transmission has a priority over video transmission, thus audio transmission can be responsive to the timing set during stage 520, (iv) video transmission will be at the original timing or delayed, thus there is no need for buffer simulation in order to prevent overflow at this stage, (v) underflows can be easily detected during scheduling of NV and if an underflow is detected a black frame is added, (vi) in case video transmission is delayed it will transmitted at the minimal bit rate which preserves the original video end tx, capped by maxBR.

Stage 560 can include at least one of the following stages: (i) transmitting CVA data stream metadata units (it is noted that once this transmission ends the last CVA data stream metadata unit was transmitted), (ii) re-stamping NV data stream metadata units, (iii) merging data stream metadata units representative of audio (CA and mute frames) with data stream metadata units representative of video stream that includes black frames and NV; (iv) checking if the merged stream extended into NVA, (v) if such an extension is detected—adding data stream metadata units that represent an addition of black frames, (vi) re-stamping NVA, and (vii) re-stamping and transmitting NVA.

According to an embodiment of the invention stage 560 includes assembling a control output stream from multiple processed first and second data stream metadata units, wherein the assembling comprises preventing a timing gap between the $(n+1)^{th}$ video out time and the $(n+1)^{th}$ video in time that is smaller than the first video frame interval.

According to another embodiment of the invention stage 560 includes assembling a control output stream from multiple processed first and second data stream metadata units, the assembling comprises selectively generating output data stream metadata representative of an output stream discontinuity indicator data packet that comprises a packetised elementary stream header and a substantially empty packetised elementary stream payload, wherein the transport packet header comprises a discontinuity indicator.

According to a further embodiment of the invention stage 560 includes assembling a control output stream from multiple processed first and second data stream metadata units wherein the control output stream comprises the black set output data stream metadata if a last first data stream packet before the video out time ends with a second frame portion and a first second data stream packet after the video out time starts with a second frame portion.

Stage 560 is followed by stage 570 of transmitting an output stream in response to the control output stream.

The transition from the second data stream (back) to the first data stream differs from the transition from the first data stream to the second data stream. The difference results from the following factors: (i) PTS or DTS re-stamping are usually not allowed, (ii) possible timing gaps accumulated during the break (period between the first splice time from the first data stream to the second data stream to a second splice time from the second data stream to the first data stream) due to possible video frame rate and audio sample rate differences between second data stream and first data stream, (iii) possible overlap between data packet transmission time of the second data stream (ad) and the first data stream (primary), (iv) handling of open GOP in second data stream.

Conveniently, during the break the splicing method and splicing system selectively generate output stream metadata units representative of entitled control messages.

It is noted that if during the (n+1)'th splicing point the second data stream (second SPTS) is replaced by the first data stream (first SPTS) then various stages of method 500 should be partially altered in order to cope with some of the constraints imposed by the splicing back to the first data stream.

It is noted that during the break the splicing manager continues to perform various operations such as but not limited to PCR, PTS, and DTS re-stamping, PID re-stamping, PMT and PAT insertion, generating data stream metadata units representative of an insertion of ECM messages during the break, such as to prevent users that didn't view access controlled (encrypted) first SPTS to view the second SPTS during the break. The ECM can be transmitted in a continuous manner, regardless of the splicing. It is noted that method 500 can also include maintaining the position of the ECM relative to the crypto-period boundary when splicing out of the second SPTS back into a first (encrypted) SPTS.

A continuity counter is a four-bit field incrementing with each Transport Stream packet with the same PID that has payload. A discontinuity between adjacent continuity counter values can be signaled by a discontinuity counter indicator.

Due to the splicing from the second data stream to the first data stream a continuity counter discontinuity can occur. In order to reduce the amount of re-stamping there is a need to selectively insert discontinuity counter indicators. The discontinuity counter indicator is located within an adaptation field that does not necessarily exist in any transport packet header. On the other hand, to signal discontinuity, the transport stream packet can not consist only of a transport packet header. Conveniently, the method and system are adapted to generate, when necessary, a transport packet that includes a transport packet header that is followed by an empty packetized elementary stream header.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method for splicing a first data stream that conveys a first single program transport stream (SPTS) and a second data stream that conveys a second SPTS, the method comprises:

receiving first data stream metadata units representative of first data stream packets, second data stream metadata units representative of second data stream packets and a request to perform a splicing operation at a n'th splicing point;

performing, in response to the splicing request, transport stream layer processing of the first data stream metadata units and of the second data stream metadata units to provide a control output stream; and transmitting an output stream in response to the control output stream;

wherein the performing of the transport stream layer processing comprises:
  sorting first data stream metadata units and second data stream metadata units in response to timing information associated with the first and second data stream metadata units and in response to a n'th video out time, a n'th video in time, a n'th audio in time and a n'th audio out time;
  selectively generating output stream metadata units representative of entitled control messages to be inserted between a splicing event from the first SPTS to another splicing event to the first SPTS, wherein the first SPTS is encrypted;
  and performing the transport stream layer processing of the first and second data stream metadata units after retrieving the first and second data stream metadata units from a first and second data streams metadata memory unit that differs from an output queue that stores first and second data stream data packets.

2. The method according to claim 1 wherein the transmitting comprises multiplexing between audio data packets and video data packets between a video out point and an audio in point.

3. The method according to claim 2 wherein the multiplexing comprises delaying or splitting video data packets that overlap audio data packets.

4. The method according to claim 1 wherein the transmitting comprises transmitting output stream data packets that comprises an interleaved set of first SPTS audio frames and second SPTS video frames.

5. The method according to claim 1 wherein the stage of performing transport stream layer processing comprises preventing frames of the second SPTS to refer to frames of the first SPTS by adding a transparent frame and nullifying a data packet.

6. The method according to claim 1 wherein the stage of performing transport stream layer processing is preceded by repetitively evaluating whether to perform slicing until receiving a positive evaluation.

7. The method according to claim 1 wherein the second SPTS is an advertisement program.

8. The method according to claim 1 wherein the stage of performing transport stream layer processing comprises sorting first data stream metadata units and second data stream metadata units in response to timing information associated with the first and second data stream metadata units and in response to the n'th video out time, the n'th video in time, the e n'th audio in time and the n'th audio out time.

9. The method according to claim 1 wherein the stage of performing transport stream layer processing comprises selectively generating output data stream metadata representative of an output stream discontinuity indicator data packet that comprises a transport header, a packetised elementary stream header and a substantially empty packetised elementary stream payload, wherein the transport header comprises a discontinuity indicator; and wherein the transmitting further comprises transmitting an output stream that comprises at least one output stream discontinuity indicator data packet.

10. The method according to claim 1 wherein the stage of performing transport stream layer processing comprises selectively altering program clock reference, PTS and DTS values and selectively inserting black frames to prevent video buffer overflow and to prevent overlap of video from the first and second SPTS.

11. The method according to claim 1 further comprising receiving a request to perform a splicing operation at a $(n+1)^{th}$ splicing point; wherein the first SPTS is characterized by a first video frame interval; and wherein the stage of performing transport stream layer processing comprises preventing a timing gap between the $(n+1)^{th}$ video out time and the $(n+1)^{th}$ video in time that is smaller than the first video frame interval.

12. The method according to claim 11 wherein the preventing comprises reducing the timing gap by inserting at least one blank video frame at the video frame rate of the first SPTS to minimize the timing gap.

13. The method according to claim 11 wherein the stage of performing transport stream layer processing comprises selectively generating output data stream metadata representative of an output stream discontinuity indicator data packet that comprises a transport packet header and a substantially empty transport packet payload, wherein the transport packet header comprises a discontinuity indicator.

14. The method according to claim 1 wherein the first SPTS is encrypted; and wherein the stage of performing transport stream layer processing comprises selectively generating output stream metadata units representative of entitled control messages to be inserted between a splicing event from the first SPTS to another splicing event to the first SPTS.

15. The method according to claim 14 wherein the stage of performing transport stream layer processing comprises generating a control output stream that is representative of changes in timing of audio conveying data packets transmission; and wherein the generating of output stream metadata units representative of entitled control messages is responsive to the changes in the timing of the transmissions.

16. The method according to claim 14 wherein the stage of selectively generating output stream metadata units comprises inserting an entitled control messages to enable a decryption of the first SPTS immediately after the (n+1)th video in time.

17. The method according to claim 1 wherein each of the first SPTS and the second SPTS comprises multiple frames, each frame comprises a first frame portion and a second frame portion; wherein each of the first SPTS and the second SPTS comprises an interleaved sequence of first and second frames portions; wherein the processing comprises generating a black set output data stream metadata representative of a set of black frames that comprises a first black frame portion, a second black frame portion and a first black portion; and wherein the assembling comprises assembling a control output stream that comprises the black set output data stream metadata if a last first data stream packet before the video out time ends with a second frame portion and a first second data stream packet after the video out time starts with a second frame portion.

18. The method according to claim 1 wherein the transmitting comprises transmitting an output stream that is characterized by a bit rate that does not exceed a maximal bit rate and has a sustained bit rate that is substantially equal to a sustained bit rate of a selected SPTS out of the first and second SPTS.

19. The method according to claim 1 wherein the stage of performing transport stream layer processing comprises selectively altering PTS and DTS values and selectively inserting mute frames to prevent audio buffer overflow and to prevent overlap of audio from the first and the second SPTS.

20. The method according to claim 1 wherein the transmitting comprises transmitting output stream data packets that comprises an interleaved set of first SPTS audio frames and second SPTS audio frames; wherein the interleaved set is transmitted at a bit rate that exceeds a maximal bit rate of the first SPTS audio frames and a maximal bit rate of the second SPTS audio frames.

21. The method according to claim 1 wherein the transmitting comprising transmitting output stream data packets that are associated with the second data stream at an output stream bit rate that substantially equals a bit rate of the second data stream.

22. The method according to claim 1 wherein the transmitting comprising limiting a bit rate of the output stream below a maximal allowed bit rate.

23. The method according to claim 1 wherein the stage of transmitting comprises speeding up the transmission of audio conveying data packets.

24. The method according to claim 1 further comprising determining a transmission time of media conveying data packets in response to video timing information associated with the media streams conveyed by the data packets and in response to transmission timing associated with the data packets.

25. The method according to claim 1 further comprising performing data layer processing.

26. The method according to claim 25 further comprising minimizing data layer processing operations.

27. The method according to claim 1 further comprising selectively altering PTS and DTS values and selectively inserting mute frames to prevent audio buffer overflow and to prevent overlap of audio from the first and the second SPTS.

28. The method according to claim 1 further comprising transmitting output stream data packets that comprises an interleaved set of first SPTS audio frames and second SPTS audio frames; wherein the transmitting comprises transmitting the interleaved set at a bit rate that exceeds a maximal bit rate of the first SPTS audio frames and a maximal bit rate of the second SPTS audio frames.

29. The method according to claim 1 further comprising transmitting output stream data packets that are associated with the second data stream at an output stream bit rate that substantially equals a bit rate of the second data stream.

30. A splicing system adapted to splice a first data stream that conveys a first single program transport stream (SPTS) and a second data stream that conveys a second SPTS, the splicing system comprises:
   a memory unit adapted to store first data stream metadata units representative of first data stream packets and second data stream metadata units representative of second data stream packets; and
   a processor, adapted to perform, in response a request to perform a splicing operation at a n'th splicing point, transport stream layer processing of the first data stream metadata units and of the second data stream metadata units to provide a control output stream; and wherein the system is adapted to transmit an output stream in response to the control output stream:
   wherein the processor is arranged to perform transport layer processing that comprises:
   sort first data stream metadata units and second data stream metadata units in response to timing information associated with the first and second data stream metadata units and in response to a n'th video out time, a n'th video in time, a n'th audio in time and a n'th audio out time;
   selectively generate output stream metadata units representative of entitled control messages to be inserted between a splicing event from the first SPTS to another splicing event to the first SPTS, wherein the first SPTS is encrypted; and
   perform the transport stream layer processing of the first and second data stream metadata units after a retrieval of the first and second data stream metadata units from a first and second data streams metadata memory unit that differs from an output queue that stores first and second data stream data packets.

31. The splicing system according to claim 30 further adapted to multiplex between audio data packets and video data packets between a video out point and an audio in point.

32. The splicing system according to claim 31 wherein the processor is adapted to delay or split video data packet that overlap audio data packets.

33. The splicing system according to claim 30 further adapted to transmit, at a bit rate that exceeds a maximal bit rate of the first SPTS audio frames and a maximal bit rate of the second SPTS video frames, output stream data packets that comprises an interleaved set of first SPTS audio frames and second SPTS video frames.

34. The splicing system according to claim 30 wherein the processor is adapted to prevent frames of the second SPTS to refer to frames of the first SPTS by adding a transparent frame and nullifying a data packet.

35. The splicing system according to claim 30 wherein the processor is adapted to repetitively evaluate whether to perform slicing until receiving a positive evaluation.

36. The splicing system according to claim 30 wherein the processor is adapted to splice a second SPTS that is an advertisement program.

37. The splicing system according to claim 30 wherein the processor is adapted to sort first data stream metadata units and second data stream metadata units in response to timing information associated with the first and second data stream metadata units and in response to the n'th video out time, the n'th video in time, the n'th audio in time and the n'th audio out time.

38. The splicing system according to claim 30 wherein the processor is adapted to selectively generate output data stream metadata representative of an output stream discontinuity indicator data packet that comprises a transport packet header and a substantially empty transport packet payload, wherein the transport packet header comprises a discontinuity indicator.

39. The splicing system according to claim 30 wherein the processor is adapted to selectively alter program clock reference, DTS and PTS values and selectively insert black frames to prevent video buffer overflow and to prevent overlap of video from the first and second SPTS.

40. The splicing system according to claim 30 wherein the processor is adapted to further prevent a timing gap between a $(n+1)^{th}$ video out time and a $(n+1)^{th}$ video in time that is smaller than a video frame interval of the first SPTS.

41. The splicing system according to claim 40 wherein the processor is adapted to reduce the timing gap by inserting at least one blank video frame at video frame rate of the first SPTS.

42. The splicing system according to claim 30 wherein the processor is adapted to selectively generate output data stream metadata representative of an output stream discontinuity indicator data packet that comprises a transport packet header and a substantially empty transport packet payload, wherein the transport packet header comprises a discontinuity indicator.

43. The splicing system according to claim 42 wherein the first SPTS is encrypted; and wherein the processor is adapted to selectively generate output stream metadata units representative of entitled control messages to be inserted between a splicing event from the first SPTS to another splicing event to the first SPTS.

44. The splicing system according to claim 42 wherein the processor is adapted to generate a control output stream that is representative of changes in timing of transmission audio conveying data packets; and to generate output stream metadata units representative of entitled control messages in response to the changes in the timing of the transmissions.

45. The splicing system according to claim 42 wherein the processor is adapted to insert an entitled control messages to enable a decryption of the first SPTS immediately after the (n+1)th video in time.

46. The splicing system according to claim 42 wherein each of the first SPTS and the second SPTS comprises multiple frames, each frame comprises a first frame portion and a second frame portion; wherein each of the first SPTS and the second SPTS comprises an interleaved sequence of first and second frames portions; wherein the processor is adapted to comprises generate a black set output data stream metadata representative of a set of black frames that comprises a first black frame portion, a second black frame portion and a first black portion; and to assemble a control output stream that comprises the black set output data stream metadata if a last first data stream packet before the video out time ends with a second frame portion and a first second data stream packet after the video out time starts with a second frame portion.

47. The splicing system according to claim 42 wherein the processor is adapted to transmit an output stream that is characterized by a bit rate that does not exceed a maximal bit rate and has a sustained bit rate that is substantially equal to a sustained bit rate of a selected SPTS out of the first and second SPTS.

48. The splicing system according to claim 30 further adapted to prevent overlaps between video data packets of the second data stream that precede an n'th audio point in time and between video data packets of the second data stream that start from the n'th audio in point.

49. The splicing system according to claim 30 further adapted to perform data layer processing.

50. The splicing system according to claim 30 further adapted to minimize data layer processing operations.

51. The splicing system according to claim 30 further adapted to selectively alter PTS and DTS values and selectively insert mute frames to prevent audio buffer overflow and to prevent overlap of audio from the first and the second SPTS.

52. The splicing system according to claim 30 further adapted to transmit output stream data packets that comprises an interleaved set of first SPTS audio frames and second SPTS audio frames; wherein the splicing system transmits the interleaved set at a bit rate that exceeds a maximal bit rate of the first SPTS audio frames and a maximal bit rate of the second SPTS audio frames.

53. The splicing system according to claim 30 further adapted to transmit output stream data packets that are associated with the second data stream at an output stream bit rate that substantially equals a bit rate of the second data stream.

54. The splicing system according to claim 30 further adapted to limit a bit rate of the output stream below a maximal allowed bit rate.

55. The splicing system according to claim 30 further adapted to speed up the transmission of audio conveying data packets.

56. The splicing system according to claim 30 further adapted to determine a transmission time of media conveying data packets in response to video timing information associated with the media streams conveyed by the data packets and in response to transmission timing associated with the data packets.

* * * * *